United States Patent [19]

Youmans

[11] 3,911,562

[45] Oct. 14, 1975

[54] METHOD OF CHEMICAL POLISHING OF PLANAR SILICON STRUCTURES HAVING FILLED GROOVES THEREIN

[75] Inventor: Albert Peeplis Youmans, Cupertino, Calif.

[73] Assignee: Signetics Corporation, Sunnyvale, Calif.

[22] Filed: Jan. 14, 1974

[21] Appl. No.: 432,839

[52] U.S. Cl. ........................ 29/590; 29/580; 156/7; 156/17; 156/20; 252/79.3

[51] Int. Cl.² ........................ B01J 17/00; H01L 1/10

[58] Field of Search .............. 156/7, 17, 20; 51/293, 51/308, 309; 252/79.3; 29/580, 583, 578, 590

[56] References Cited

UNITED STATES PATENTS

| | | | |
|---|---|---|---|
| 3,372,063 | 3/1968 | Suzuki et al. | 148/1.5 |
| 3,411,200 | 11/1968 | Formigoni | 29/580 |
| 3,436,286 | 4/1969 | Lange | 156/17 |
| 3,738,883 | 6/1973 | Bean et al. | 156/17 |

*Primary Examiner*—William A. Powell
*Assistant Examiner*—Brian J. Leitten
*Attorney, Agent, or Firm*—Flehr, Hohbach, Test, Albritton & Herbert

[57] ABSTRACT

Method of chemical polishing of planar silicon structures by use of a silicon semiconductor body having planar surfaces with recesses therein opening through the surface. A stop layer is formed on the surface and then the recesses are filled with a filling material. The semiconductor structure with the filled surface is then polished by the use of a polishing pad and applying to the polishing pad a first active chemical agent and applying a second chemical agent to the pad at the same time that the first chemical agent is being applied. The polishing is continued until the stop layer is reached.

9 Claims, 3 Drawing Figures

METHOD OF CHEMICAL POLISHING OF PLANAR SILICON STRUCTURES HAVING FILLED GROOVES THEREIN

BACKGROUND OF THE INVENTION

In the past when isolation moats or grooves on a semiconductor structure are provided and extend through the top surface, they form a top surface on which it is difficult to deposit metallization and to delineate the metallization for small geometries. To overcome this problem, the moats or recesses have been filled with a suitable material such as polycrystalline silicon. There, however, has been considerable difficulty in filling these grooves precisely to provide a planar surface. In the filling of such grooves or moats, an excess of the filling material is provided on the surface. Considerable difficulty has been encountered in removing this excess filling material on the surface of the wafer. The disclosures in two articles listed below merely relate to chemical polishing of silicon wafers before any fabrication has been accomplished in the silicon wafers.

"Silicon Planar Chemical Polishing" by J. Ragh and G. A. Silvey, published in Electro-chemical Technology, March-April 1968, pages 155–158

"Polishing of Silicon by Cupric Ions Process" by Mendel and Yang, published in the Proceedings of the IEEE, Vol. 57 No. 9, September 1969, pages 1476–1480

The methods disclosed therein have not been particularly satisfactory for use in connection with the present invention because portions of the silicon semiconductor body are also removed. There is, therefore, a need for a new and improved method of chemical polishing of planar silicon structures.

Summary of the Invention and Objects

The method for chemical polishing of planar silicon structures having filled grooves therein is accomplished by using a silicon body having a planar surface with recesses therein opening through the planar surface. A stop layer is formed on the surface. The recesses are filled with a filling material. The planar surface is then polished by applying a polishing pad to the surface. A first active chemical agent is applied to the pad and at the same time a second active chemical agent is applied to the pad. The polishing action is continued until the pad engages the stop layer.

In general, it is an object of the present invention to provide a method of chemical polishing of planar silicon structures in which it is possible to obtain a planar surface even after filled moats have been provided therein.

Another object of the invention is to provide a method of the above character in which polishing pads are utilized.

Another object of the invention is to provide a method of the above character in which two separate chemical agents are applied separately to the polishing pad.

Another object of the invention is to provide a structure of the above character in which great precision in polishing can be obtained.

Another object of the invention is to provide a method of the above character in which the rate of polishing can be readily adjusted.

Additional objects and features of the invention will appear from the following description in which the preferred embodiment is set forth in conjunction with the accompanying drawing.

BRIEF DESCRIPTION OF PREFERRED EMBODIMENT

Figure 1:
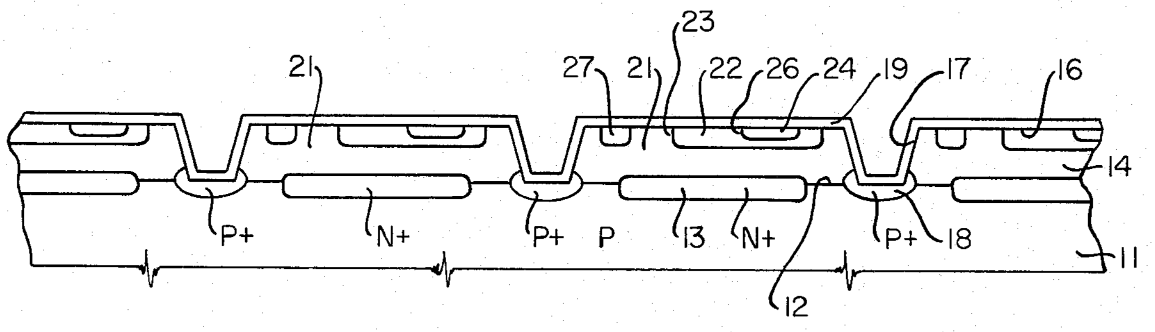
FIGS. 1–3 are cross-sectional views showing the steps utilized in performing the method incorporating the present invention.
Figure 2:
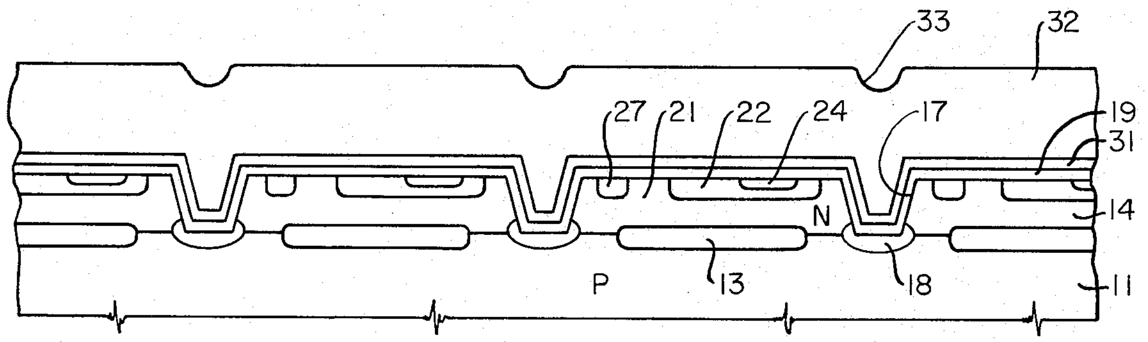
Figure 3:
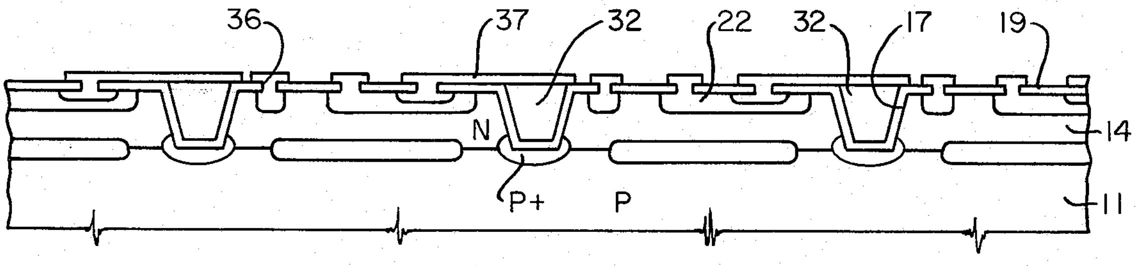

The method of the present invention which is utilized for chemically polishing of planar silicon structures having filled recesses therein is performed in accordance with the steps shown in FIGS. 1–3. A typical semiconductor structure on which the method can be utilized is shown in FIG. 1. Such a semiconductor structure, as described in copending application Ser. No. 414,764, filed Nov. 12, 1973, consists of a semiconductor body 11 formed of a suitable material such as silicon which is provided with a surface 12. The body 11 has an impurity of one conductivity type as, for example, P-type disposed therein.

A plurality of buried layers 13 are formed in the semiconductor body 11 through the surface 12 in a manner well known to those skilled in the art. Thereafter, an epitaxial layer 14 of semiconductor material is formed on the surface 12 also in a manner well known to those skilled in the art and can have the desired impurity type as, for example, N-type therein. During the time that the epitaxial layer 14 is being grown, the buried layers 13 will have a tendency to diffuse upwardly into the epitaxial layer 14. The epitaxial layer is provided with a planar surface 16. Moats 17 which are generally V-shaped in cross-section are formed in the epitaxial layer 14 and extend downwardly through the surface 16 so that the lower extremities of the same are at least in the vicinity of the surface 12 which is in the form of a PN junction between the body 11 and the epitaxial layer 14. Regions 18 of grater impurity concentration are formed beneath the moats or grooves 17 in a manner described in copending application Ser. No. 169,294, filed Aug. 5, 1971, now U.S. Pat. No. 3,796,612. Thus, in the embodiment shown, the regions 18 have been identified as P+ regions. A layer 19 of a suitable insulating material such as silicon dioxide is formed on the side walls defining the moats 17 and on the surface 16 of the epitaxial layer. The silicon dioxide layer 19 can have a suitable thickness such as 9000 A. The epitaxial layer 14 has a thickness of 3½ microns; however, epitaxial layers having a thickness of 1 to 2 microns can be utilized. The moats 17 in combination with the regions 18 and the PN junction 12 serve to provide isolated islands 21 formed between the moats and in which semiconductor devices have been formed. Thus, as shown in the drawing, transistors have been provided in a conventional manner. Thus, there have been provided base regions 22 formed in the islands 21 and are defined by dish-shaped PN junctions 22 which extend to the surface. The regions 22 have a P-type impurity therein. Emitter regions 24 having an N-type impurity therein are formed within the regions 22 and are defined by dish-shaped PN junctions 26 which also extend to the surface 16. N+ collector contact regions 27 are formed in the islands to make contact to the collector regions.

A stop layer 31 is formed of a suitable material such as silicon nitride ($Si_3N_4$) is formed on the layer 19 in a conventional manner by the use of an epitaxial reactor and introducing silane and ammonia to form the nitride. The stop layer 31 can have a suitable thickness as, for example, 1500A which is utilized as a stop for chemical action as hereinafter described. Other materials can be utilized for the stop layer. However, silicon nitride is particularly satisfactory because it is compatible with the remainder of the processing for the semiconductor structure. It will be noted that the stop layer 31 extends into the grooves or moats 17 as shown in FIG. 2. It should be appreciated that if desired it is not necessary that the stop layer 31 extend into the grooves or moats. In such a case the stop layer 31 is applied prior to the moat etching step. A suitable material is then provided for filling the moats or grooves 17. By way of example, this can be in the form of a layer 32 of polycrystalline silicon which has a depth which is more than sufficient to fill the moats or grooves 17. Thus, by way of example, with moats or grooves having a depth of approx-imately 3½ microns, approximately 5 microns of polycrystalline silicon can be deposited on the silicon nitride stop layer 31. As shown in FIG. 2, the grooves or moats 17 are completely filled but small dips or recesses 33 in the top surface of the poly overlie the moats or grooves.

The structure shown in FIG. 2 is now ready for polishing in accordance with the present invention. A chemical-mechanical polish is utilized which does not incorporate an abrasive so that the stop layer 31 which is provided need only stop the chemical action because the mechanical action provided is very mild. A cupric ion process is utilized for chemically polishing the surface to provide a relatively planar surface.

The chemical-mechanical polishing is accomplished by the use of a conventional polishing machine. The wafers to be polished are mounted on polishing blocks which are placed on the polishing machine. The polishing machine has a pad which is adapted to engage the wafers carried by the polishing blocks. The solution which is utilized in the process is dripped onto the pad continuously during the polishing operation. In order to remove material at an optimum rate which in the present cast must be relatively slow because the layer being polished is so thin, and it is desired to maintain good control. By way of example, in one embodiment of the present invention, a removal rate of one micron per minute was found to be satisfactory.

This removal rate was obtained by the use of a solution consisting of 300 cc's of water ($H_2O$), 150 cc's of ammonium fluoride ($N_0H_4F$) and 20 cc's of copper fluoborate. In order to prevent precipitate forming in the solution, it has been found desirable to provide two separate pumping systems for feeding the two chemicals, namely ammonium fluoride and copper fluoborate separately onto the pad where the two active chemicals are mixed with water to provide the desired mixture at the pad. This ensures that the solution being provided to the pad is fresh at all times. It should be appreciated however, that the two chemicals used can be mixed prior to application to the pad but this is not as advantageous as applying them separately because of aging problems.

Although the solution does not give the most rapid polishing rate, it does provide an excellent balance between chemical and mechanical action so that there is the least amount of chemical polishing below the surface in the groove areas. In the removal process, there basically occurs a copper ion displacement of silicon atoms. The chemical process polishes by chemical plating of copper onto the silicon in which the copper displaces the silicon atoms in the reaction. In the polishing machine, the pad wipes away the copper which is not very strongly adherent to the silicon and exposes new silicon which subsequently casues the plating of more copper thereon which displaces more silicon. With the formation of the solution hereinbefore described, a relatively small amount of copper is available in the solution which provides for the slower rate of removal which is desirable to obtain the precise control necessary. However, if it is desired to increase the rate of removal, it is merely necessary to increase the copper content of the solution. For example, to increase the rate of removal from 1 to 2 microns per minute, this can be accomplished by doubling or tripling the amount of copper in the solution.

The polishing action continues until the grooves 33 in the polycrystalline material disappear and then as the polishing pad reaches the surface of the silicon nitride stop layer 31, no further reaction can take place because the copper cannot plate on the non-conductive silicon nitride. Removal of the polycrystalline layer 32 stops when the level of the polycrystalline material is level with the silicon nitride surface. Thus, it can be seen that the silicon nitride layer acts as a chemical stop because it is attacked extremely slowly by the ammonium fluoride and thus very little non-uniformity results. As pointed out above, it has been found that 1500 A of silicon nitride is sufficient to serve as the stop.

After the polishing action has been completed, the wafers are removed, cleaned and then are ready for further processing and are in the condition shown in FIG. 3. During the polishing operation, a pad is utilized which is soft but not too soft so that it will conform to slight surface irregularities on the surface of the wafer. A suitable pad has been found to be Pellon XP500.

Thereafter, the silicon nitride layer 19 can be removed so that there remains the silicon dioxide insulating layer. Apertures or windows 36 are formed in an insulating layer which extend down to the regions of the active devices provided in the islands. Thereafter, metallization is formed on the silicon dioxide layer 19 extending through the apertures and making contact with the regions to provide a pluraty of leads 37. As can be seen from FIG. 3, the leads 37 can readily extend over the filled islands or moats 32 without any difficulty since the surface is substantially planar.

It should be appreciated that, if desired, the silicon nitride layer 31 can be left in place; for example, in a beam lead construction, the silicon nitride layer can be utilized as a passivating layer.

It is apparent from the foregoing that there has been provided a new and improved method for chemically polishing planar silicon structures having filled grooves which makes it possible to obtain a substantially planar surface without removing substantial material from the grooves. The process is relatively simple and can be precisely controlled so that an excellent planar surface can be obtained. It should be appreciated that although a separate stop layer in the form of silicon nitride has been provided, it is possible to utilize the silicon dioxide layer itself as a stop. However, it will not be as satisfactory because there is some chemical action between the silicon dioxide and the ammonium fluoride. Thus, although some of the oxide is removed, it will stand up sufficiently long to permit necessary polishing to be carried out even though it will result in some uneven thicknesses of the oxide.

I claim:

1. In a method for polishing utilizing a relatively soft polishing pad, providing a silicon semiconductor body having a planar surface with grooves therein opening through the surface, forming a stop layer on said surface, filling said grooves with a filling material, applying the polishing pad to the surface of the body having the grooves therein and applying first and second active chemicals to said pad causing relative movement between the relatively soft polishing pad and the silicon wafer to provide a polishing action and continuing the polishing action to remove excess filling material until the stop layer is reached so as to provide a generally planar surface in which filling material still fills the grooves so that the last named generally planar surface is uninterrupted.

2. A method as in claim 1 wherein the first and second chemicals are mixed in relatively close proximity to the pad and immediately prior to the time that they are introduced onto the pad.

3. A method as in claim 1 wherein said first and second active chemicals includes ammonium fluoride and a copper compound.

4. A method as in claim 3 wherein said first and second chemicals are in a mixture which has a ration of 300 cc of water, 150 cc of ammonium fluoride and 20 cc of the copper compound.

5. A method as in claim 1 wherein said stop layer is formed of silicon nitride.

6. A method as in claim 5 wherein said silicon nitride has a thickness of approximately 1500 A.

7. A method as in claim 1 wherein said material filling said grooves is in the form of polycrystalline silicon.

8. A method as in claim 1 wherein said grooves define isolated islands together with the step of forming active devices in the isolated islands, providing leads on the layer of insulating material extending through the layer of insulating material and making contact to the active devices.

9. A method as in claim 8 wherein the leads are formed so they extend over the filled grooves.

* * * * *